United States Patent [19]
Jones et al.

[11] Patent Number: 5,926,113
[45] Date of Patent: *Jul. 20, 1999

[54] AUTOMATIC DETERMINATION OF TRAFFIC SIGNAL PREEMPTION USING DIFFERENTIAL GPS

[75] Inventors: Gary V. Jones, Bolingbrook, Ill.; Ronald R. Hatch, Wilmington, Calif.; James R. Hume, Rolling Hills Estate, Calif.; Richard G. Keegan, Torrance, Calif.

[73] Assignee: L & H Company, Inc., Oak Brook, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/435,523

[22] Filed: May 5, 1995

[51] Int. Cl.⁶ ............................. G08G 1/07; G08G 1/095
[52] U.S. Cl. ......................... 340/906; 340/907; 340/988; 701/201; 701/213
[58] Field of Search ................................... 340/906, 988, 340/909, 910, 911, 924, 902, 991, 993, 995, 907, 990; 364/444.1, 449.1, 449.4; 342/358; 701/201, 202, 207, 208, 213

[56] References Cited

U.S. PATENT DOCUMENTS

| | | | |
|---|---|---|---|
| 3,644,883 | 2/1972 | Borman | 340/991 |
| 4,017,825 | 4/1977 | Pichey | 340/906 |
| 4,135,144 | 1/1979 | Elmasian | 340/906 |
| 4,162,477 | 7/1979 | Munkberg | 340/906 |
| 4,359,733 | 11/1982 | O'Neill | 701/207 |
| 4,449,116 | 5/1984 | Hill et al. | 340/909 |
| 4,573,049 | 2/1986 | Obeck | 340/924 |
| 4,884,208 | 11/1989 | Marinelli et al. | 701/300 |

(List continued on next page.)

FOREIGN PATENT DOCUMENTS

| | | | |
|---|---|---|---|
| 0444738A2 | 4/1991 | European Pat. Off. | G01S 5/24 |
| 2281141 | 2/1995 | United Kingdom | 340/909 |
| WO8706713 | 11/1987 | WIPO | G01S 5/02 |
| WO9419021 | 7/1995 | WIPO | G08G 1/087 |

OTHER PUBLICATIONS

Request for Proposal G23002U, vol. III, Chicago Transit Authority, 1992; pp. 16, 17, 18, 54.

The International Conference on Automatic Vehicle Location in Urban Tansit Systems, Sep. 19–21, 1988, Gilles David; including the following articles.

The French Experience with Automatic Vehicle Location in Urban Transportation Systems; pp. 18, 19, 20, 21, 24, 26, 27, 28, 29, 30.

(List continued on next page.)

*Primary Examiner*—Jeffery A. Hofsass
*Assistant Examiner*—Van T. Trieu
*Attorney, Agent, or Firm*—Lawrence S. Cohen, Esq.

[57] ABSTRACT

A traffic signal preemption system, and a related method for its use, using differential global positioning system (GPS) measurements for accurate monitoring of the position, speed and direction of an emergency or service vehicle approaching a controlled intersection. The preemption system includes a reference GPS receiver, for computing GPS measurement corrections, and a GPS receiver in each vehicle, which transmits its GPS measurements by radio to a receiver located at the controlled intersection. A computer also located at the intersection uses corrected vehicle position, speed and direction measurements, in conjunction with previously recorded data defining approach routes to the intersection, to determine the optimum time to switch a traffic light controller to preemption mode to permit safe passage of the vehicle. GPS measurement corrections may be applied in a vehicle computer or in the computer located at the intersection. Other modes of operation of the system include a self-survey mode, whereby the reference GPS receiver determines its own true position by averaging position measurements over a period of a day or two, and a learn mode, whereby the intersection computer "learns" unusual approach routes to the intersection as the vehicle traverses the approach routes and transmits position and velocity measurements.

18 Claims, 10 Drawing Sheets

U.S. PATENT DOCUMENTS

| | | | |
|---|---|---|---|
| 4,914,434 | 4/1990 | Morgan et al. | 340/906 |
| 5,014,052 | 5/1991 | Obeck | 340/906 |
| 5,083,125 | 1/1992 | Brown et al. | 340/906 |
| 5,119,504 | 6/1992 | Durboraw, III | 455/575 |
| 5,379,224 | 1/1995 | Brown et al. | 701/215 |
| 5,452,212 | 9/1995 | Yokoyama et al. | 364/444 |
| 5,475,597 | 12/1995 | Buck | 340/988 |
| 5,497,149 | 3/1996 | Fast | 340/988 |
| 5,539,398 | 7/1996 | Hall et al. | 340/907 |

OTHER PUBLICATIONS

Experience on S.I.S. Torino's Public Transport Operation Aid System; pp. 59, 60, 64, 66, 67, 70.

Continuous Various Discrete Bus Location; Factors and Costs; pp. 265, 266, 269, 270, 271, 278.

Integration of AVL and Transit Priority Systems in The Federal Republic of Germany; pp. 283, 284, 286, 290, 291, 294, 295, 297.

The Why and Wherefores of Location Accuracy in French AVL Systems; pp. 308, 313, 314, 320, 321.

Aircraft Automatic Landing Systems Using GPS, Journal of Navigation v.42, No. 1 (Jan. 1989) pp. 47–59.

GPS Van System; MapCam System; Imaging Systems; Post Processing; Training, Support and Maintenance; Columbus Ohio Real Time Mapping Systems Center, The Ohio State University; prior to 1993.

Literature, GPS World, Sep./Oct. 1990.

Products, GPS World, Jan./Feb. 1990.

Mapping Finnish Roads With Differential GPS and Dead Reckoning, GPS World, Feb. 1991.

Digital Road Mapping with GPS and GIS, GPS World, May 1991; pp. 33–37, 57.

ACSM Bulletin, one page being Jul./Aug. 1992, p. 55.

S.I.S., An Operation IAD System—The Experience in A.T.M. Torino; International Conference "Computer—Aided Operating Systems and Traffic in the Cities", Nov. 30–Dec. 2, 1992; pp. 3,5,6,10.

Integrated Traffic Control On Urban Arterials, 1992; p. 538.

Vehicle Navigation & Information Systems, 1992, conference; A. Bolelli, M. Chifari, A. Margaria, R&D Department, Mizar Automazione S.P.A. Torino, Italy; p. 134.

Fleet Management in Public Transport, 1992 conference; Anderson. pp. 312, 314, 316.

Automatic Vehicle Location/Control and Traffic Signal Preemption—Lessons from Europe, Chicago Transit Authority, Sep. 1992. pp. 3, 4, 7, 9, 17, 18, 19, 22, 23, 30, 31; and the following articles as Appendices.

The "BON" Standardized Management System, Dr. Gerhard Heunemann; The New SSB Control Center, 1990; Green on Request, 1991.

"The Zurich Model", light transit to combat congestion, Ernst Joos; Zurich—Pioneer Approach to Traffic Control; and BON—Computerized operating control system for public transportation.

Radionavigation/Location Requirements For Surface Users in Canada (Part I), Thompson–Hicking Aviation Inc., 1988; pp. 49, 66, 67, 68, 69, 70, 73, 77, 79, Fig. 3–1, C–2, C–3, C–4.

The Cermak Road Bus Preemption Study, Illinois Department of Transportation, 1993.

Article Entitled "Overview of Differential GPS Methods", Earl G. Blackwell, SRI International, Menlo Park, California 1985.

Differential GPS Explained; Jeff Hurn for Trimble Navigation 1993.

AUTOMATIC DETERMINATION OF TRAFFIC SIGNAL PREEMPTION USING DIFFERENTIAL GPS

BACKGROUND OF THE INVENTION

This invention relates generally to control of traffic signals under emergency conditions and, more particularly, to systems for automatic control of traffic signals in such a way as to preempt normal signal operation and permit the unimpeded and safe passage of emergency vehicles, such as ambulances, police cars, fire trucks and so forth. There is a related need for preemption control systems to give priority to non-emergency vehicles, such as buses, which have to maintain a schedule in busy traffic. It has been widely accepted that, particularly in high density traffic areas, there is a vital need for such systems. Not only must an emergency vehicle be free to move through an intersection in a selected direction of travel, but the traffic flow in other directions, which could interfere with the movement of the emergency vehicle, must be stopped by an appropriate signal indication until the emergency vehicle has passed.

A number of present day systems have been utilized to accomplish this general purpose, but all have fallen short of the desired result in some respect. A common approach has been to provide apparatus on the emergency vehicle to transmit an emergency signal to a receiver associated with the traffic signal. The traffic signal controller, which has been suitably modified, is actuated to operate the signals in a predetermined emergency sequence. Some systems of this type require the installation of a receiver or sensor under the road surface, to detect where the vehicle is located with respect to the traffic signals. Obviously, systems of this type present difficulties of installation and maintenance. Various traffic preemption systems use radio signals, infrared signals, ultrasonic signals, audio signals or optical signals transmitted from the emergency vehicle and detected in some manner at the controlled intersection. A common difficulty with all systems of the prior art is that of accurately determining the time of arrival of the vehicle at the intersection. Clearly, preemption of normal traffic control should not occur too early. Apart from the obvious inefficiency this entails, there is an element of risk in that impatient drivers may try to enter a controlled intersection before the emergency vehicle arrives. Various techniques have been proposed for determining vehicle location for use in traffic preemption. For example, electronic "signposts" can be installed beside or beneath the roadway to detect the passage of vehicles. Such systems are used, for example, to determine the locations to help maintain more accurate bus schedules. For the traffic preemption problem, however, installing multiple sensors or "signposts" near each intersection would be very expensive and still would not necessarily provide the desired accuracy.

More specifically, optical preemption systems are limited by the line of sight between the vehicle and the intersection control unit. Audio preemption systems detect the sound of an approaching siren on an emergency vehicle and take appropriate action. Unfortunately, the sound can be blocked by other vehicles or buildings, and microphones must be installed at points approaching the intersection.

Radio preemption systems currently available utilize signal strength to determine distance from the intersection. However, natural variations in terrain and man-made obstructions render this approach quite inaccurate.

Beacon based systems are more accurate, but do not permit subsequent adjustment to preemption distance needed for changing traffic patterns or construction zones. Also the installation cost of a beacon system is high because long lengths of underground cable have to be installed beneath the intersection and its approaches. Sensor loops underground are used to sense the vehicle positions, but are prone to breakage in cold weather. A failed sensor can render the system inoperative while repairs are made over an extended period, possibly months.

Another common aspect of traffic signal preemption systems is that they are typically manually actuated from the emergency vehicle. When the driver actuates a button or switch in the vehicle, an emergency signal is transmitted to the controller at the intersection, to preempt normal operation and modify the controller temporarily for passage of the vehicle. Some systems allow the driver to indicate a direction of turn at the intersection, so that the traffic signals can be appropriately controlled during preemption. However, existing preemption systems are typically not optimized to disrupt normal traffic control for as short a time as possible, or to clear as much of the interfering traffic as possible from the intersection. Moreover, existing preemption systems have no provision for preempting signals at adjacent intersections to one side or the other of the vehicle direction of travel when a preemption request is made. In existing systems, some intersections may not be preempted soon enough, if the vehicle deviates from a straight path along a single street, and may be preempted unnecessarily if the vehicle turns before reaching a nearby preempted intersection. The present invention has the goal of providing safe and unobstructed passage for emergency vehicles, while at the same time minimizing disruption of normal traffic through the intersection, and eliminating many of the disadvantages of the prior art systems.

SUMMARY OF THE INVENTION

The present invention resides in a traffic signal preemption system using differential global positioning system (GPS) measurements, and a related method of operation of the system. Briefly, and in general terms, the system of the invention includes a traffic signal subsystem and a vehicle subsystem. The traffic signal subsystem includes a GPS reference receiver having an antenna installed at a known position, for receiving GPS signals and computing measurement corrections for the GPS signals, a traffic signal controller capable of operation in a normal mode, and in a preemption mode when an emergency vehicle approaches the intersection, a communication radio for receiving data from an approaching emergency or other vehicle, and an intersection computer, containing a model of the intersection and used for processing received signals indicative of vehicle position, speed and direction. The intersection computer uses the received data to determine when to switch the traffic signal controller to and from preemption mode. The vehicle subsystem includes a mobile GPS receiver for receiving GPS signals, a communication radio for transmitting data to the traffic signal subsystem radio, and a vehicle computer, for coordinating operation of the vehicle GPS receiver and the vehicle communication radio. Corrected vehicle position, speed and direction measurements are used by the intersection computer to determine when to switch the traffic signal controller to and from preemption mode in such a way as to minimize disruption of normal traffic.

In one embodiment of the system, the GPS measurement corrections computed by the intersection computer are transmitted to the vehicle, and the vehicle computer computes corrected measurements of vehicle position, speed and direction for transmission back to the traffic signal subsystem. In another embodiment, the vehicle communication radio transmits uncorrected vehicle position, speed and direction measurements to the traffic signal subsystem, and the intersection computer computes corrected vehicle position, speed and direction measurements. In yet another embodiment, the vehicle communication radio transmits raw GPS measurements to the traffic signal subsystem, and the intersection computer computes uncorrected and corrected vehicle position, speed and direction measurements. In still another embodiment, a single GPS reference receiver serves multiple controlled traffic intersections and broadcasts GPS measurement corrections to multiple vehicles in the same vicinity. The vehicle computer in each vehicle computes corrected measurements of vehicle position, speed and direction for transmission to the traffic signal subsystem.

Preferably, the vehicle subsystem includes a turn signal indicator, wherein the vehicle communication radio also transmits turn signal and vehicle identification information to the traffic signal subsystem and to other adjacent intersection subsystems. An adjacent intersection in the path of a turning vehicle can issue a preemption output earlier than if it had waited for the vehicle to approach in the normal way, thereby allowing traffic in the adjacent intersection to be cleared soon enough for the vehicle's arrival. Moreover, nearby intersections that are not on the vehicle's path can ignore preemption requests received from vehicles that are about to turn from their current path.

The traffic signal preemption system may also be operated in a "learn" mode in which a manually operated switch in the vehicle is actuated at a selected points on each approach route to the intersection; and the traffic signal subsystem includes means for operating in the learn mode, during which each approach route to the intersection is recorded for later use in a normal mode of operation.

In accordance with the method of the invention, the preemption system performs the steps of receiving global positioning system (GPS) signals at a reference GPS receiver whose location is accurately known; computing differential position corrections to be applied to the position measurements derived from the received GPS signals; receiving GPS signals at a vehicle GPS receiver; transmitting some form of the received vehicle GPS signals to a traffic signal intersection subsystem; computing corrected measurements of vehicle position, speed and direction; and computing from the vehicle position, speed and direction measurements, taken with known intersection approach data, an optimum time or position for switching to a preemption mode of traffic control.

One embodiment of the method further includes the step of transmitting position corrections to each vehicle. In this embodiment the step of computing corrected measurements is performed in the vehicle; and the step of transmitting some form of received vehicle GPS signals transmits corrected vehicle position, speed and direction measurements.

In another embodiment of the method, the step of computing corrected measurements is performed in the traffic signal intersection subsystem; and the step of transmitting some form of received vehicle GPS signals transmits uncorrected vehicle position, speed and direction measurements.

In yet another embodiment of the method, the step of computing corrected measurements is performed in the traffic signal intersection subsystem; and the step of transmitting some form of received vehicle GPS signals transmits raw GPS measurements obtained in the vehicle.

Preferably, the method also includes the step of transmitting from the vehicle to the traffic signal intersection subsystem additional data including vehicle identification information and vehicle turn signal information.

In accordance with another aspect of the invention, the method further comprises the step of determining in the reference GPS receiver an accurate position of the receiver, by averaging position measurements taken periodically over a long time interval. In accordance with yet another aspect of the invention, the method further comprises the step of operating the system in a "learn" mode, including switching the system to learn mode, driving the vehicle over each approach route to the intersection, mapping the approach routes to the intersection for use in normal operation, actuating a switch in the vehicle at a vehicle position in which preemption of the traffic signal is desired, and recording the desired position of preemption for later use in normal operation.

It will be appreciated from the foregoing summary that the present invention represents a significant advance in the field of traffic signal preemption systems. In particular, the invention provides extremely accurate data defining an approaching vehicle's position, speed and direction, which data can be used in a variety of preemption algorithms to minimize disruption of normal traffic. The system of the invention may also be operated in a "self-survey" mode to provide accurate position data for a reference GPS receiver used by the system, and in a "learn" mode to record parameters relating to each approach route to an intersection. Other aspects and advantages of the invention will become apparent from the following more detailed description, taken in conjunction with the accompanying drawings.

DESCRIPTION OF THE PREFERRED EMBODIMENTS

Figure 1:
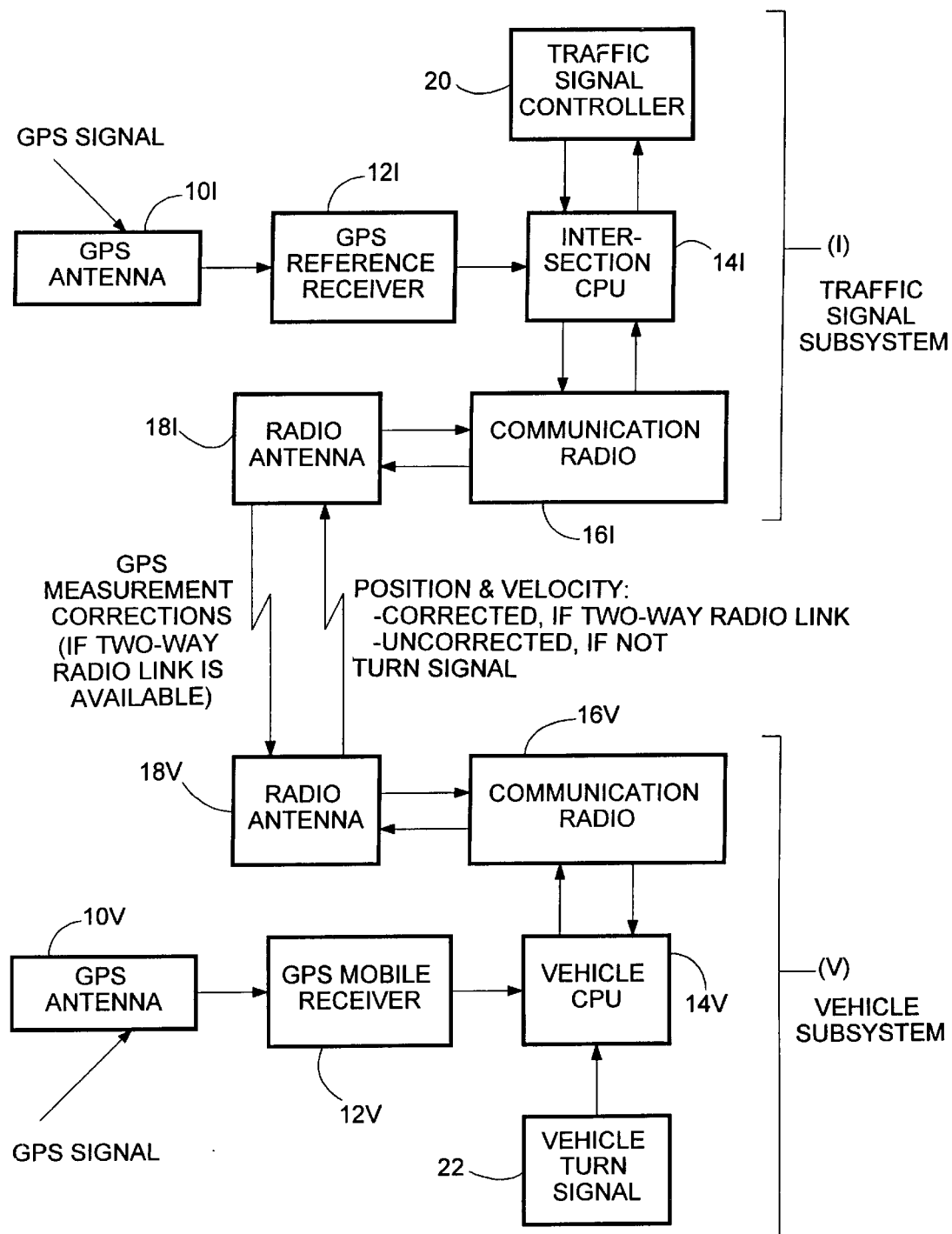
FIG. 1 is a block diagram of a traffic signal preemption system in accordance with the present invention.

As shown in the drawings for purposes of illustration, the present invention is concerned with a traffic signal preemption system, which preempts normal traffic control for emergency vehicles and other vehicles, such as buses, but minimizes disruption of normal traffic. A number of embodiments of the invention are described below, but all make use of a technique known as differential GPS (differential global positioning system) to measure the position, direction and speed of an emergency vehicle relative to a controlled traffic signal.

Briefly, by way of further background, the global positioning system (GPS) is a system of multiple orbiting satellites that transmit radio signals of a known format. A GPS receiver on or near the earth's surface receives signals from multiple GPS satellites simultaneously and computes the position of the receiver in threedimensional space, using well known signal processing techniques. GPS was originally intended as a military navigation tool and permits vehicles to obtain their latitude, longitude and altitude accurately. The basis for these calculations is the measurement of the distance or range between the receiver and each of several uniquely identifiable satellites from which transmissions are received. These range values are referred to as "pseudorange" measurements. They are subject to a timing or clock bias error because the receiver is not necessarily synchronized with the satellite transmitters. From the pseudorange measurements for at least four visible satellites, and a knowledge of the orbital positions of the satellites, referred to as ephemeris data, which is also transmitted from each satellite, the position of the receiver is calculated and the clock bias error is eliminated. The accuracy of GPS for commercial purposes is deliberately limited by government control of the satellite signals. For many commercial applications, such as navigation on the open sea, position determination to an accuracy of a hundred meters or so is more than sufficient. Increased positional accuracy for other commercial purposes can be obtained using a technique known as differential GPS (DGPS). In DGPS, an additional GPS receiver, called the reference receiver, is installed at a fixed location and its position is determined to a high degree of accuracy using any available means. Since the reference receiver already "knows" its position, it can determine any error in a position as determined from currently received GPS signals. The amount of the error can then be transmitted to one or more nearby mobile GPS receivers, which can correct their GPS-determined positions. An assumption is usually made that the errors in GPS-determined position are the same for all receivers that are relatively close together. Using DGPS, positions of mobile GPS receivers can be determined to almost the same accuracy as that of the known position of the reference receiver. DGPS is used, for example, for marine navigation close to shore, with the reference receiver being located on land near the coastline.

FIG. 1 illustrates how the principle of DGPS is applied in a traffic signal preemption system. The apparatus includes a traffic signal subsystem located at a street intersection, indicated generally by reference character I, and a vehicle subsystem V. Since each of the subsystems I and V include similar components, they will be referred to by the same reference numerals, with the suffix I or V. The traffic signal subsystem has a GPS antenna 10I, a GPS receiver 12I, which is the reference receiver, a computer or central processing unit (CPU) 14I, a communication radio 16I and an associated radio antenna 18I. Similarly, the vehicle subsystem includes a GPS antenna 10V, a GPS receiver 12V (the mobile receiver), a computer CPU 14V, a communication radio 16V and a radio antenna 18V.

The traffic signal subsystem also includes a conventional traffic signal control unit 20 coupled to the CPU 14I, such that the computer can both monitor the status of the control unit and, to a limited degree, control or modify the control unit to operate in a preemption mode or various specific preemption modes. The vehicle computer 14V receives input from the vehicle turn signal, as indicated at 22, and is thus made aware of the intended direction of turn of the vehicle as it approaches an intersection.

The intersection CPU 14I performs two principal functions:

(1) The intersection CPU will use the GPS reference receiver measurements together with the known antenna location to compute an estimate of the local receiver clock time. Then, after removing any clock bias from the pseudorange code measurements, the CPU will compute a correction value which would cause each of the pseudorange measurements to represent accurately the distance between the satellite and the reference GPS antenna 10I. The pseudorange correction values are then passed on to the communication radio 16I for transmission to participating vehicles in the vicinity.

(2) The differentially corrected GPS position, together with the direction and speed of the vehicle is received back from the vehicle subsystem, through the radio communication link, and transferred to the intersection CPU 14I. Included with this information will be the status of the vehicle turn signal indicator. The received information, together with the status of the traffic signal control unit 20, is used to generate a preemption control signal to the traffic signal control unit and a command as to the desired state of the traffic signal.

The functions of the vehicle subsystem are generally complementary to those of the intersection subsystem. The GPS antenna and receiver in the vehicle supply the GPS measurements and satellite position information to the vehicle CPU 14V. The communication radio 16V and associated antenna 18V receive the measurement corrections transmitted from the reference subsystem, and transmit back the computed position, direction and speed of the vehicle, together with the status of the vehicle turn signal. The task of the vehicle CPU 14V is to use the GPS measurement and orbit information together with the measurement corrections received from the reference receiver in the intersection subsystem, to compute an accurate position and speed of the vehicle, along with its direction of travel. When the position, direction and speed data are computed, they are passed to the communication radio, together with the turn signal status, security codes and other pertinent information, for transmission to the traffic signal reference subsystem at the intersection.

As described thus far, the system of the invention utilizes a two-way communication link between the vehicle and the traffic signal subsystem. The traffic signal subsystem transmits GPS measurement corrections to the vehicle, and the vehicle transmits back to the traffic signal subsystem the corrected position, speed and direction, as well as turn signal, vehicle identification and other pertinent information. Various other configurations are possible and within the scope of the invention, as summarized in the following table.

| Configuration | Data transmitted TO vehicle | Data transmitted FROM vehicle | Remarks |
|---|---|---|---|
| (A) Two-way radio link. | GPS measurement corrections, either: | Corrected GPS position, speed & | Corrections made in vehicle CPU |

-continued

| Configuration | Data transmitted TO vehicle | Data transmitted FROM vehicle | Remarks |
|---|---|---|---|
| | (1) GPS pseudo-range corrections, (2) GPS position corrections. | direction; turn signal; vehicle id., etc. | and transmitted to intersection CPU. |
| (B) One-way radio link. | None. | Uncorrected GPS position, speed and direction; turn signal; vehicle id., etc. | Corrections made in intersection CPU. |
| (C) One-way radio link. | None. | Raw GPS measurements; turn signal; vehicle id., etc. | Corrections made in intersection CPU. |
| (D) Separate one-way radio links. | GPS measurement corrections broadcast to all vehicles in area; either: (1) GPS pseudo-range corrections, (2) GPS position corrections. | Corrected GPS position, speed & direction; turn signal; vehicle id., etc. | Corrections made in vehicle CPU and transmitted to intersection CPU. |

Configuration (A)(1) is the one described above, using a two-way radio communication link. Configuration (A)(2) is similar except that the intersection CPU computes corrections in measured position, rather than corrections in the raw GPS pseudoranges. The vehicle CPU then uses the position corrections to compute corrected position, speed and direction data for transmission to the intersection.

In configuration (B), the vehicle computes its position, speed and direction from received GPS signals and transmits this uncorrected data to the intersection CPU over a one-way radio link. As in the other configurations, the turn signal indicator is also transmitted, together with vehicle identification, security, and other information. The intersection CPU corrects the position, speed and direction data for the vehicle and performs the necessary traffic signal control functions. Nothing is transmitted back to the vehicle.

Configuration (C) also uses a one-way radio communication link, but the vehicle CPU in this case does not compute its position, speed and direction. Instead, raw GPS measurements are transmitted to the intersection CPU, which computes the vehicle position, speed and direction, and then applies corrections based on its own GPS measurements and known position. Again, nothing is transmitted back to the vehicle.

Configuration (D) is similar to the two-way radio communication link of configuration (A), except that there is no requirement that a GPS reference receiver be located at every controlled intersection. Instead, a single reference receiver could be used for an extended geographical area, which may be as large as an entire city for some installations. The GPS measurement corrections, either pseudorange corrections (configuration (D)(1)) or position corrections (configuration (D)(2)), are broadcast to all of the vehicles in the area covered by the reference receiver. Each vehicle has a one-way radio communication link with each controlled intersection, and transmits corrected position, speed and direction measurements to the intersection.

With regard to the two options, (1) and (2), for transmitting corrections to the vehicle, the first option, transmitting pseudorange corrections, is generally preferred because then the vehicle can make use of the corrections even if the same satellites are not being tracked. The other option of transmitting position corrections requires less data to be transmitted, but requires in addition some means for ensuring that the same satellites are being tracked.

Self-Survey Mode

As discussed above, differential GPS depends on accurate knowledge of a reference GPS receiver antenna. This requirement can met by making a survey of the reference location and determining its position with respect to a local survey datum point. However, the required accuracy for the location of the reference antenna in the traffic preemption system can be met quite easily using the reference GPS receiver in a self-survey mode. Self-survey means the use of the GPS reference receiver to make an accurate determination of its own position. One way of doing this is to capture the result of GPS position determination periodically over an extended period, e.g., every five minutes over one or two days. A common source of position errors is multipath effects, whereby a signal transmitted from a satellite to a receiver takes an undesired alternate path due to reflections from geographical or man-made objects. Because each satellite is a moving transmission source, the multipath effects vary with time, but only relatively slowly. Multipath errors are said to be strongly correlated with time, and there is little benefit to averaging measurements taken at closely spaced intervals because the errors are not changing rapidly enough. Sampling position measurements every five minutes or so involves far less computation and data, and the averaged position is almost as accurate as if measurements had been taken every second. Errors due to multipath effects are virtually eliminated if the position measurements are averaged over a long observation period. In most cases, it should be possible to determine the reference antenna position to an accuracy of a few meters, which is more than adequate for the traffic signal preemption application. Another approach for averaging the position measurements over an extended period is to modify a standard GPS receiver to use a different statistical data filtering technique. GPS receivers typically employ a Kalman filter that is implemented to provide independent position measurements at each GPS time epoch. The Kalman filter can be modified to directly combine successive measurements to obtain a best average position solution. This involves changing the filter such that the position states are not propagated in time. Instead, all measurements are processed to arrive at the single best position that fits all the data. An equivalent alternative to this stationary Kalman filter implementation is a Least Squares solution which incorporates all measurement data into a single best solution.

From a cost standpoint, any of these methods is probably preferable to performing a survey to determine the location of the GPS reference antenna. Averaging measurements over a day or two costs virtually nothing, and the statistical methods that require a modified receiver can be implemented by modifying a single receiver and temporarily installing it at each reference receiver site to determine the position with accuracy.

Learn Mode

Another innovative feature of the invention is its ability to operate in a "learn" mode in which a vehicle equipped with a differential GPS receiver is driven over all routes that approach the controlled traffic signal. While driving these approach routes, an operator button or other indicator in the vehicle is used to indicate the appropriate distance, which can be a mean distance or a maximum and minimum distance, at which the approaching vehicle should cause preemption of the traffic signal. In the learn mode, frequent samples of the approaching vehicle position, as transmitted to the intersection receiver site, will be sampled, stored and subsequently processed to define the possible approach paths to the traffic signal. The learn mode will allow the same path to be traversed a number of times, if necessary, to smooth out errors due to either positioning noise or small variations in the path followed by the vehicle. The learn mode should only be necessary to define intersections with unusual or curved approach paths. Most intersections can be defined by standard intersection models. The data obtained during learn mode is processed to provide a mathematical description of each approach path. For curved paths, a mathematical approximation may be required to match the observed approach path data.

Basic sequence of operations

Figure 2:
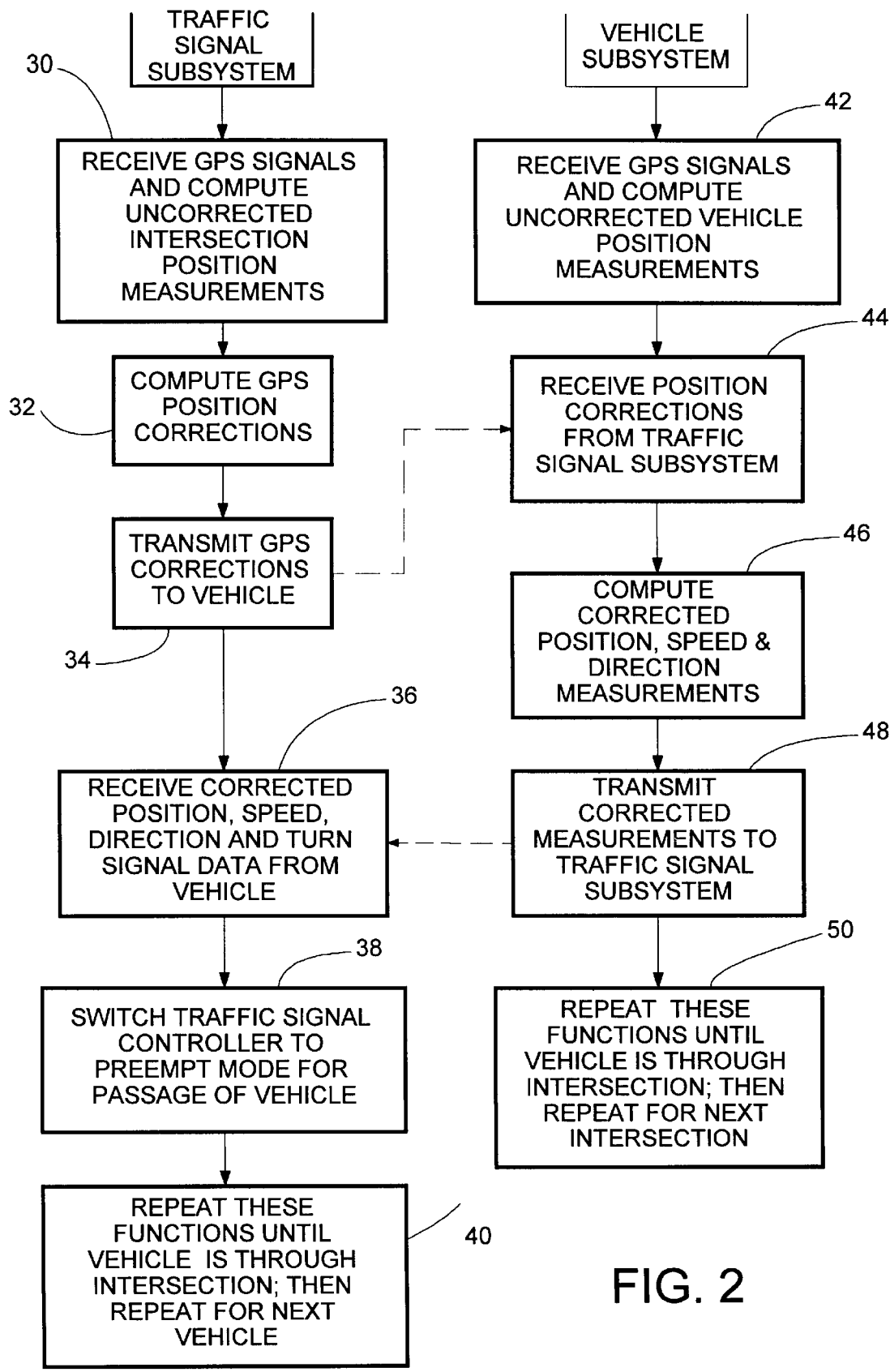
FIG. 2 is a flowchart depicting functions performed by the traffic signal preemption system of FIG. 1.

FIG. 2 shows the basic functions performed by the traffic signal subsystem and the vehicle subsystem. The traffic signal subsystem receives GPS signals from multiple satellites and first computes uncorrected position measurements indicative of the uncorrected position of the GPS reference receiver antenna. This function is indicated in block 30. It will be understood that, although the flowchart of FIG. 2 implies a sequence of operations, some of the described functions may be performed on a continuous basis in parallel with other functions. As indicated in block 32, the position measurement corrections are computed from the uncorrected measurements and a knowledge of the actual position of the reference receiver antenna.

As shown in block 34, the position measurement corrections are transmitted to the vehicle, or all vehicles in the vicinity. FIG. 2 depicts the two-way radio communication embodiment of the invention, referred to earlier as configuration A. It will be understood, of course, that the corrections may not necessarily be transmitted to the vehicles, but may be applied to uncorrected data transmitted from the vehicle. It will also be understood that the modifications to FIG. 2 to operate as configurations B, C or D may be easily made.

As shown in block 36, the traffic signal subsystem next receives corrected data back from the vehicle, indicative of vehicle position, speed and direction. Using this received data, together with previously stored data defining the approach routes to the intersection, the traffic signal subsystem determines when to switch the traffic controller to preemption mode and back into normal mode, as indicated in block 38 and further defined in FIG. 3. The functions described above are performed repeatedly while the vehicle is approaching and passing through the intersection. Once the vehicle is safely through the intersection and the controller is back in normal mode, the traffic signal subsystem has competed its task, which is repeated for other vehicles approaching the intersection, as indicated in block 40.

The vehicle subsystem, as also shown in FIG. 2, receives GPS signals in its own mobile GPS receiver and computes uncorrected position data, as indicated in block 42. The vehicle then receives position measurement corrections from the traffic signal subsystem, as indicated in block 44, and computes corrected measures of position, speed and direction, as indicated in block 46. These corrected values are then transmitted back to the traffic signal subsystem, as indicated in block 48. The vehicle subsystem functions are performed repeatedly until the vehicle is through the intersection, and repeated again for other intersections, as indicated in block 50.

Basic traffic control functions

Figure 3:
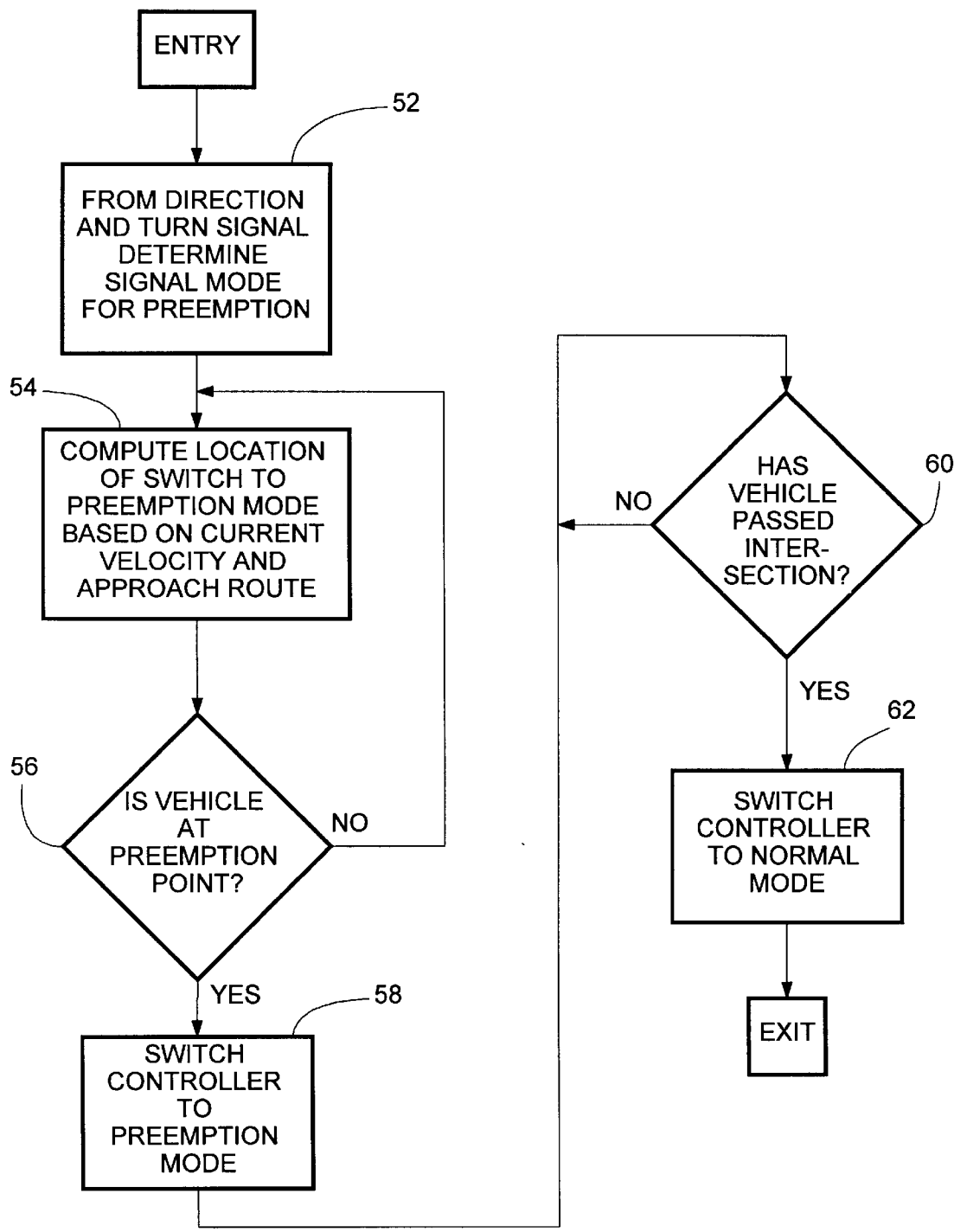
FIG. 3 is a flowchart depicting the functions performed by the intersection computer in controlling switching between normal mode and preemption mode of operation of the traffic signal controller.

The function described broadly in block 38 of FIG. 2 is shown in more detail in FIG. 3. It will be understood, however, that the invention is not limited to a specific traffic signal preemption algorithm and any of a number of different approaches may be used to determine when and how to preempt the traffic signals based on the information derived from the approaching emergency vehicle. The first broad step, shown in block 52, is to determine from the vehicle position and direction data the specific preemption mode that will be used. The vehicle turn signal is also used in this determination. From these data components, the vehicle's intended path through the intersection is determined and appropriate steps are taken to prepare for a switch to the preemption mode. In a simple case, normal operation may continue until the switch is made. In a more complex preemption technique, the vehicle approach time may be used to clear the intersection in an appropriate manner. When the vehicle is signaling an intended direction of turn at the intersection, preemption may involve multiple intersections, as discussed in a separate descriptive section below.

As shown in block 54, the next step is to compute an estimated position (on the vehicle approach route) at which switching to preemption mode should most desirably take place. Basically, the selection is made as a function of the measured vehicle speed, and the known distance to the intersection, allowance being made for an appropriate time of operation in preemption mode before the vehicle enters the intersection. Next, as indicated in decision block 56, the vehicle's current position is compared with the estimated "preemption point" on the approach route. If the preemption point has not yet been reached, the preemption point is recomputed, in block 54, based on more current position and speed data, and the vehicle's position is again compared with the preemption point position. When the preemption point is reached, the traffic controller is switched to preemption mode, as indicated in block 58. Then the vehicle position is monitored to determine when the vehicle has passed through the intersection, as indicated in decision block 60. When this occurs, the traffic controller is switched back to normal operation mode, as indicated in block 62, and the preemption task is complete.

More Detailed Example of Preemption Control

Figure 4:
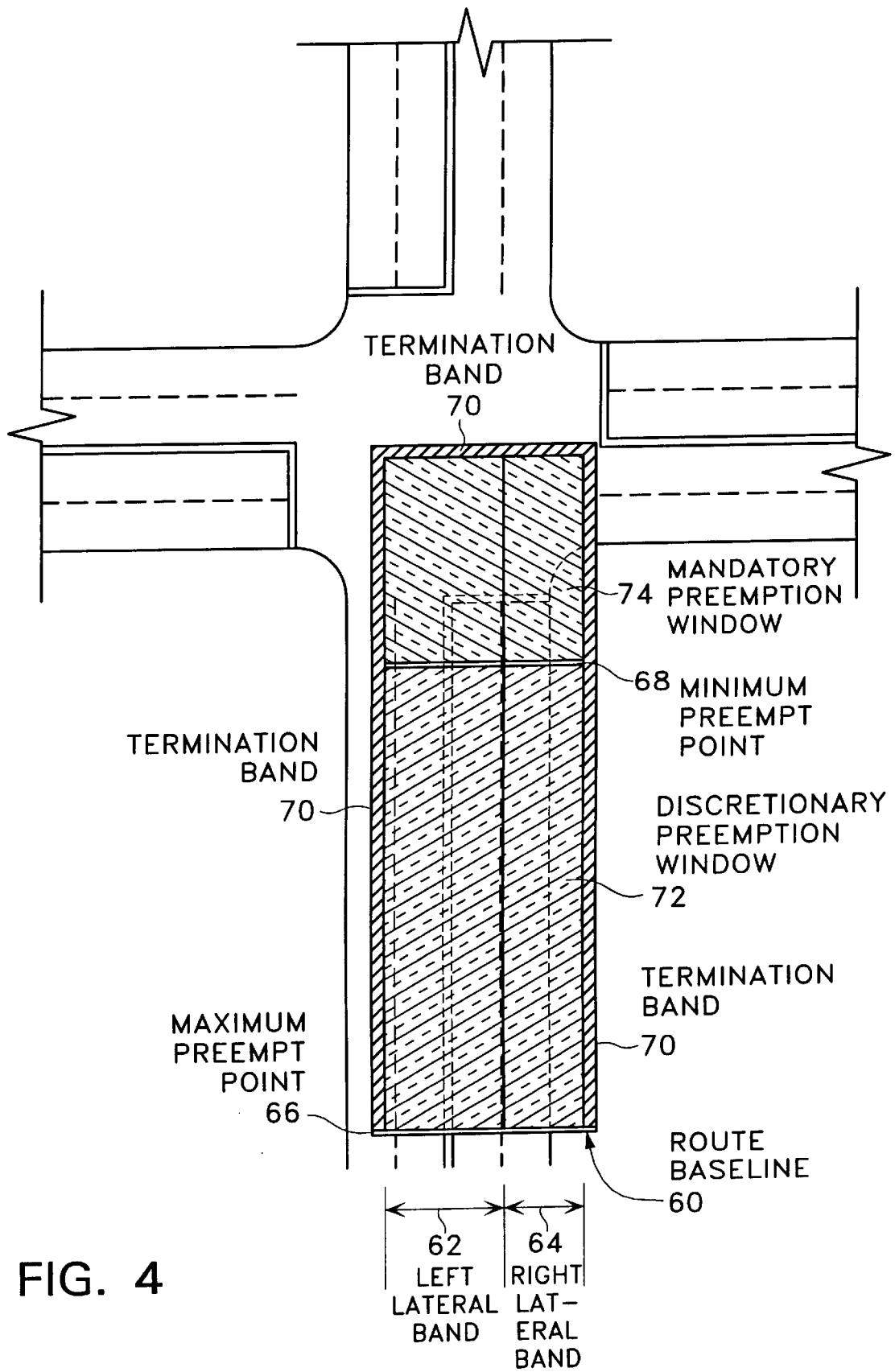
FIG. 4 is a plan view of an intersection, labeled to indicate various terms used to describe a vehicle route through the intersection.

To understand how the traffic signal subsystem operates requires the introduction of some terminology defining the geometry of an intersection, as shown in FIG. 4 for a simple right-angle intersection. Each approach route to the intersection may be unique, but the four routes will be practically identical in the symmetrical intersection illustrated in FIG. 4. The elements of each include:

The "route baseline" 60 comprises a number of GPS coordinates sufficient to define the basic route of travel required to traverse the intersection in a given direction.

The "left lateral band" 62 is a band running parallel to the route baseline on its left side, as viewed from a vehicle following the route baseline, and defining the left boundary of the route.

The "right lateral band" 64 serves the same purpose as the left lateral band, but on the opposite side of the route baseline.

The "maximum preempt point" 66 is a line defining the furthest distance from the intersection at which a preemption output will be allowed to be activated.

The "minimum preempt point" 68 is a line defining the nearest distance from the intersection at which a preemption output must be activated.

The "termination band" 70 is a band defining the outer edges of the preemptive route through the intersection, along the left, right and front edges. Any vehicle that has been granted a preemption output based on passage through either or both "preemption windows" (defined below), shall have its preemption output terminated upon passage through the termination band.

The "discretionary preemption window" 72 is that portion of the route extending from the maximum preempt point line at the rear to the minimum preempt point line at the front, and from the left lateral band to the right lateral band. A vehicle entering this window and requesting a preempt shall be granted the request provided there are no other requests of equal or higher priority being serviced. The exact point within the window where the preemption is granted is determined by a calculation of the time required by the vehicle to reach the intersection at its current speed and the time required by the traffic signal controller to clear the intersection.

The "mandatory preemption window" 74 is that portion of the route extending from the minimum preempt point line at the rear to the termination band at the front, left and right sides. Any vehicle entering this window and requesting a preempt shall be granted an immediate preempt output provide that no other requests of equal of higher priority are already being serviced.

In the description that follows, it should be understood that preemption of the normal traffic signal operation may be requested from two types of sources, which are designated priority-1 requests and priority-2 requests. Priority-1 requests are from emergency vehicles, such as fire trucks, ambulances and police vehicles. Priority-1 requests may also be received from base stations, such as fire or police stations located near an intersection. As will be explained, these two types of priority-1 requests are treated differently in some respects. Priority-2 requests come from public service vehicles, such as buses or garbage trucks, which must maintain schedules as closely as possible, but which do not have priority over emergency vehicles. Another aspect of handling priority-2 requests from buses is that a bus may also request "queue jumping," wherein the bus gets an early green signal when stopped in a bus lane at the intersection.

Figure 5A:
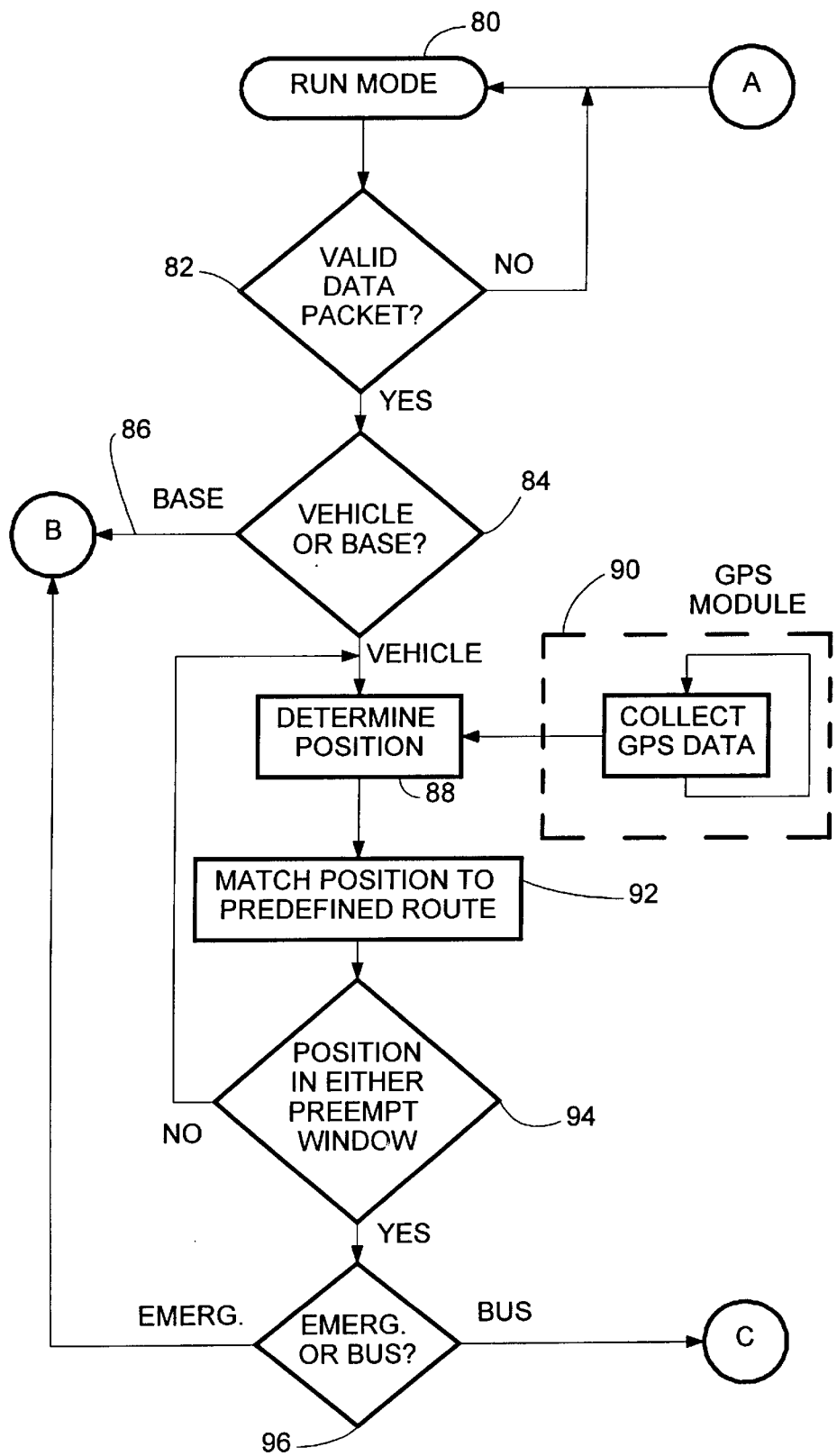
FIG. 5 is a flow diagram showing the functions performed by the intersection computer in its "run" mode.
Figure 5B:
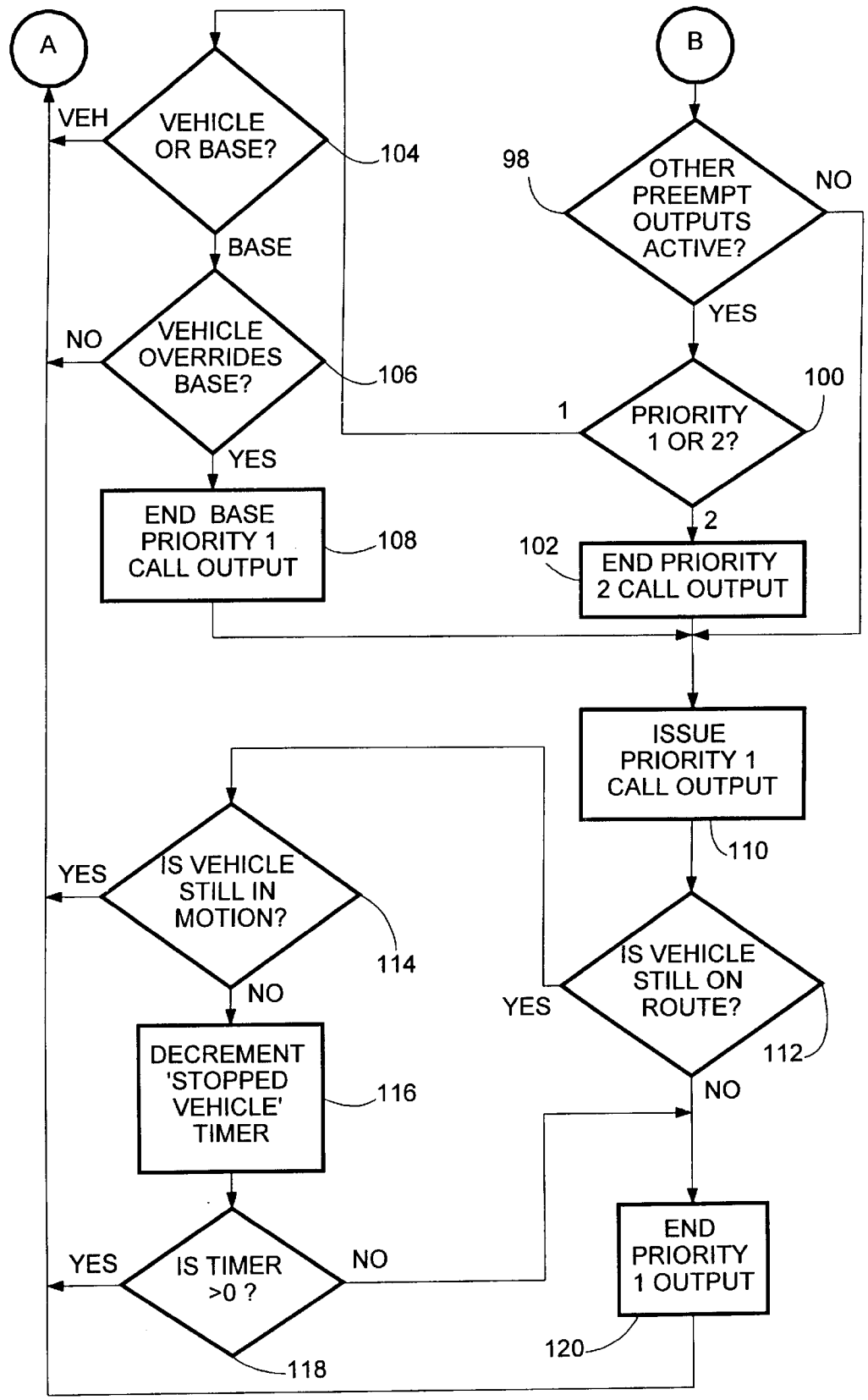
Figure 5C:
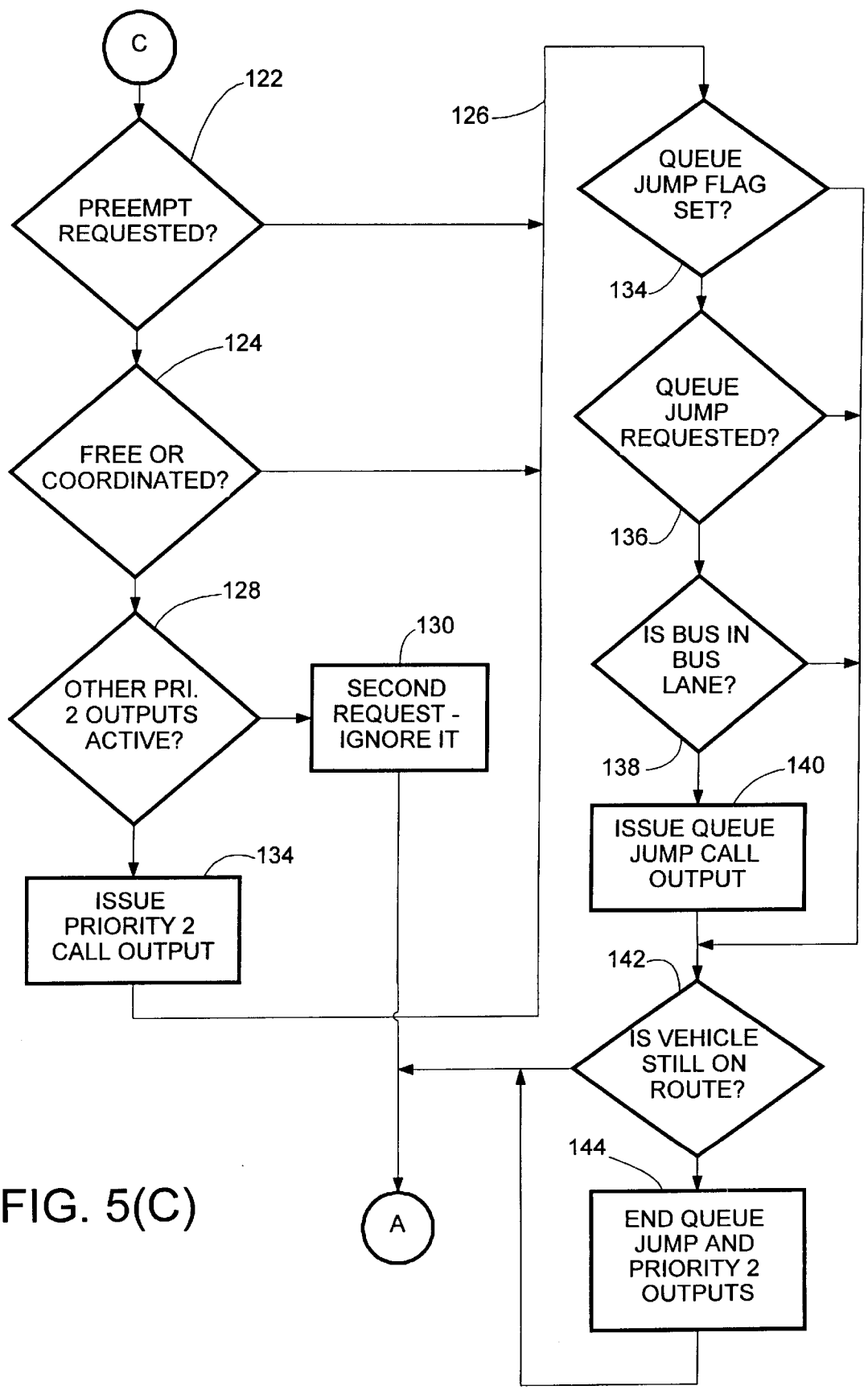

Operation of the intersection CPU 14I in its "run" mode can best be understood from the functional flow diagram of FIG. 5. In run mode, the intersection unit "listens" for signals from approaching vehicles, as indicated at 80. Upon detection of an approaching vehicle, the unit checks the incoming packet of data for validity, as indicated at 82. The validity of the system id., the agency id., the vehicle id. and the GPS data are all checked at this point. If the data is invalid in some respect, the logic flow returns to the listening mode of block 80. If valid data is received, the unit next checks to determine whether the data received is from a vehicle or from a base station, as indicated at 84. If from a base station, such as a nearby fire station, there is no need to determine GPS position and the ensuing few steps bypassed, as indicated by line 86. As indicated in block 88, the next step is to determine the vehicle position. As already discussed earlier in this specification, position determination involves a use of an intersection GPS module 90, and correction of position measurement either in the vehicle or at the intersection unit, depending on the technique selected for implementation.

The next step is to match the GPS vehicle position with a predefined template of the route baseline through the intersection, as indicated at 92. Then a comparison is made to determine whether the vehicle position is within the discretionary preempt window or the mandatory preempt window, as indicated at 94. If not, the position is recalculated, by returning to block 88 in the flow diagram. At this point the logic determines whether the vehicle is an emergency vehicle or a bus, as indicated at 96. The functions performed in the case of an emergency vehicle will be described first.

For emergency vehicle processing, the intersection unit first determines, as indicated at 98, whether other preempt outputs are active, i.e. whether other vehicles have already triggered a preempt output signal. If other preempts are already active, the unit next determines, as shown at 100, the priority of the other preempt. If the existing preempt is for bus (priority 2), the unit ends the bus's preempt output, as indicated at 102. If the existing preempt is for another emergency, the unit next determines, as indicated at 104, whether the other emergency is from a vehicle or a base station. If the other emergency was also from a vehicle, the current preempt request is ignored and the unit resumes it listening mode. (The two vehicles compete on a first-com-first-served basis.) If the other emergency was from a base station, the unit next determines whether vehicles can override base emergencies, as indicated at 106. (This is a programmable option for the intersection.) If vehicles do not override base stations at this intersection, the unit resumes its listening mode and ignores the current preempt request. If vehicles can override base station emergencies, the base station preempt is terminated, as indicated in block 108. At this point, having addressed the question of prior existing preempt outputs and distinguished between vehicle and base station emergencies, the intersection unit is now ready to issue a priority-1 (emergency vehicle or base station) preempt output, as indicated at 110.

After issuing the preempt output, the unit next checks to see if the vehicle is still on the route, as indicated in block 112. As the vehicle approaches the intersection, its position is tracked by the intersection unit to determine if it is still within the preempt windows. If the vehicle is still on the route, a further check is made to see if the vehicle is still in motion, as indicated in block 114. If a vehicle stops for some reason, this condition will be detected by the intersection unit an the preempt output will be terminated. Blocks 116 and 118 indicate that a timer is used to time the how long the vehicle has been stopped. When a time limit is exceeded, the priority-1 preempt output is ended, as indicated at 120. The preempt output is also terminated when the vehicle exits the route by crossing the termination band, as determined in block 112.

Processing of preempt requests from buses are slightly different, as indicated in the lower-right portion of the flow diagram. First it is determined whether the bus is requesting a priority-2 preempt, as indicated at 122. If so, the next test, at block 124, is to determine whether the intersection is operating in a free-running or coordinated mode. "Coordinate" means that operation of the intersection is coordinated with other intersections. If the intersection is coordinated, some agencies may not allow priority-2 preemptions. If preempt has not been requested (block 122) or if the intersection is coordinated (block 124), issuing the priority-2 preempt output is bypassed, as indicated by the line 126. Immediately before issuing the request, the unit check for the existence of other priority-2 requests, as indicated at 128. If there are any, the current request is ignored, as indicated at 130 and the unit continues in the listening mode.

If all the foregoing tests are passed for the bus preemption request, a priority-2 preempt output is issued, as indicated at 132. The remaining portion of the logic diagram pertains to "queue jumps" by buses. At some intersections, buses may be provided with a queue jump lane at the right-hand edge of the route. A signal given to that lane only allows the bus to enter the intersection a few seconds before the rest of the traffic. The unit logic first checks a queue jump flag, as indicated at 134, to determine whether queue jumping is permitted at this intersection. If not, the queue jumping logic is bypassed. If the queue jump flag is set, the next test made is to determine whether a queue jump has been requested by the bus, as indicated at 136. If not, the remaining queue jump logic is bypassed. If the request has been made, a final check is made of the bus's position, to see that it is in the bus lane that will get the queue jump signal, as indicated at 138. If so, the queue jump output is issues, as indicated at 140. If not, the output is not issued.

Regardless of whether queue jumping is implemented, if a priority-2 preempt output has been issued, the unit continues to check, as shown at 142, whether the bus position is still on the route. If so, the logic continues looping as shown. When the bus leaves the route, by crossing the termination band, the priority-2 output and any queue jump output will be terminated, as indicated at block 144.

Figure 6:
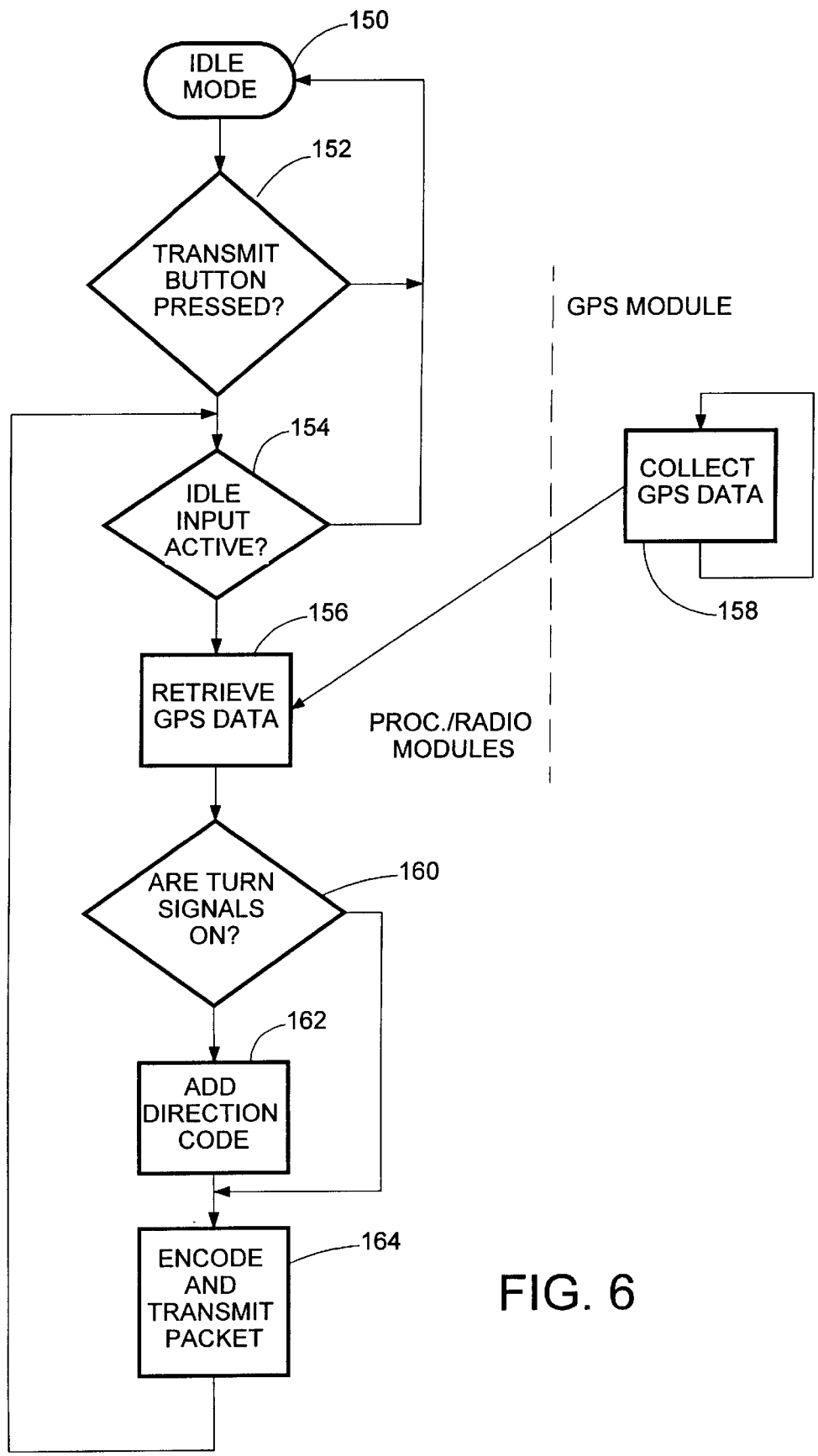
FIG. 6 is a flow diagram showing the functions performed by a vehicle subsystem in the "run" mode.

For completeness, FIG. 6 shows a similar flow diagram for operation of the vehicle subsystem, primarily the vehicle transmitter, in the "run" mode. The vehicle subsystem spends much of its time in an idle mode, as indicated at 150, checking for actuation of a transmit button, as indicated at 152, and checking whether an idle input is active, as indicted in block 154. An idle input is generated by some selected aspect of vehicle operation that would render the vehicle incapable of entering the intersection. For example, an idle input signal may be generated if the driver-side door of the vehicle is open. If the transmit button has not been pressed or if an active idle input is detected, the subsystem remains in the idle mode. Otherwise, GPS data are received from the GPS module, as indicated at 156. The GPS module collects GPS position data, is indicated generally at 158, but the flowchart has been simplified in the sense that it does not show the correction of GPS data based on information received from the intersection subsystem. If the turn signals are on, as indicated at block 160, a direction code is added to the data to be transmitted, as indicated at 162. Then a data packet is encoded and transmitted, as indicated at 164. The data packet from the vehicle includes the following elements:

System ID Code,
Agency ID Code,
Vehicle ID Code,
Priority (1 or 2),
GPS Data,
Anticipated turn direction code.

Figure 7:
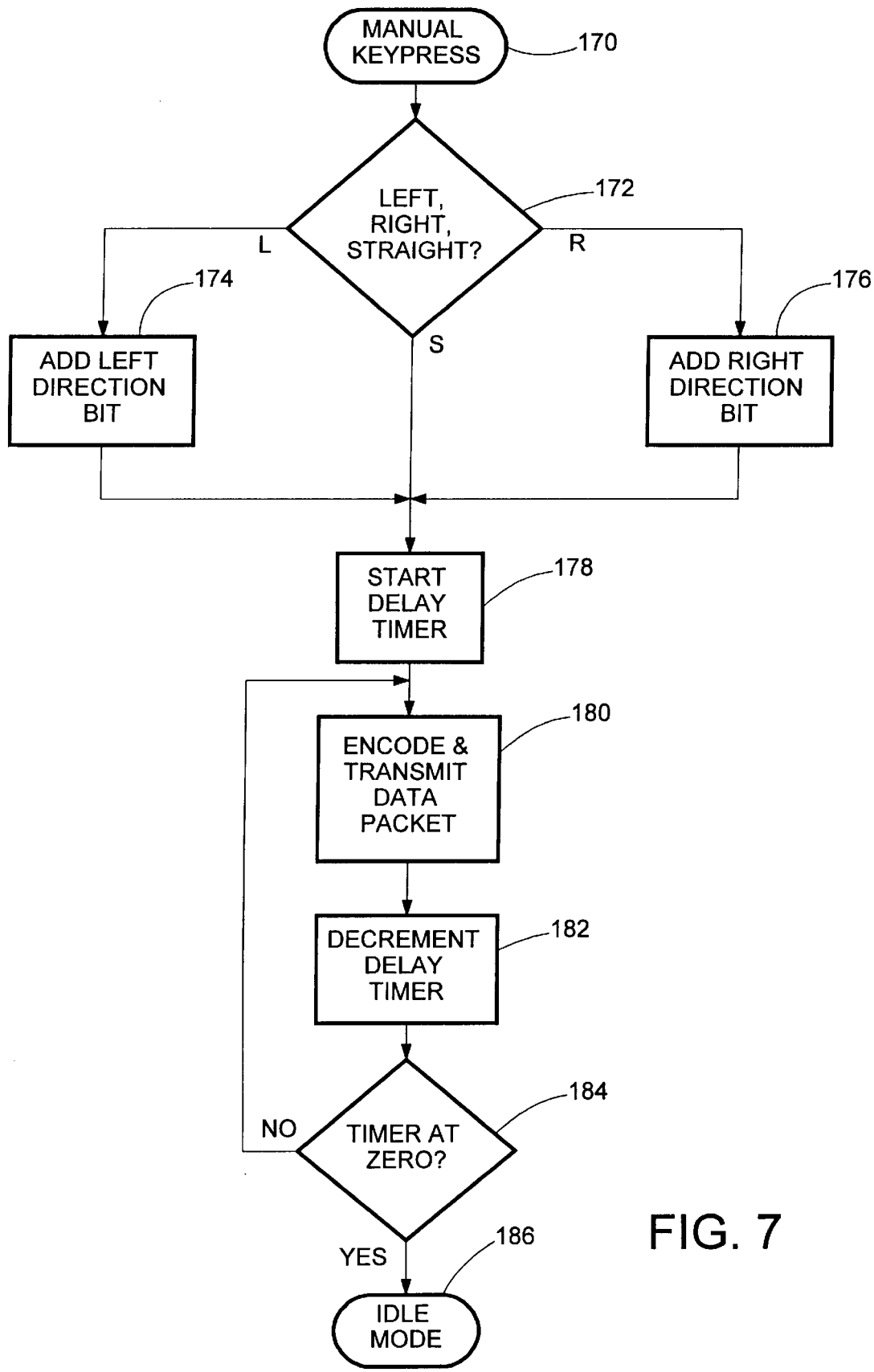
FIG. 7 is a flow diagram showing the functions performed by a base station subsystem in the "run" mode.

Operation of a base station transmitter is shown in FIG. 7. When a base station, such as a fire station located near a controlled intersection, is ready to request preemption, a manual key is pressed, as indicated at 170; then a direction change information is obtained, as indicated at 172. If a left or right turn is proposed, an appropriate bit is added to the data packet being prepared for transmission, as indicated at 174 and 176. Then a delay timer is started, as indicated at 178, and the data packet is encoded and transmitted, as indicated at 180. The delay timer is decremented, as indicated at 182, and checked for zero value in block 184. The packet is transmitted repeatedly until the delay timer has expired; then a return is made to the idle mode, as indicated at 186.

The data packet from the base station includes:

System ID Code,
Agency ID Code,
Anticip ID Code,
Base unit identifier,
Priority (1 or 2),
Anticipated turn direction code.

Preemption Utilizing Turn Signals

Preemption systems prior to the present invention could only preempt intersections directly in front of the approaching vehicle. In areas where the intersections are located close to each other, false preemptions of intersections were common, and intersections to the left or right of vehicles path were not preempted in sufficient time to allow unimpeded passage of a turning emergency vehicle. An important aspect of the present invention is its ability to allow emergency vehicles to preempt an adjacent intersection to the left or right of the vehicle's direction of travel when preemption is first requested. This feature allows the vehicle to preempt a nearby adjacent intersection before arrival at the current intersection, thereby improving safety by clearing traffic in the path of the vehicle at the adjacent intersection. A related benefit is that adjacent intersections, in directions that the vehicle will not be travelling along, do not have their signals preempted unnecessarily. By preempting only those intersections that the vehicle will cross, the system reduces disruption of normal traffic at non-preempted intersections.

Figure 8:
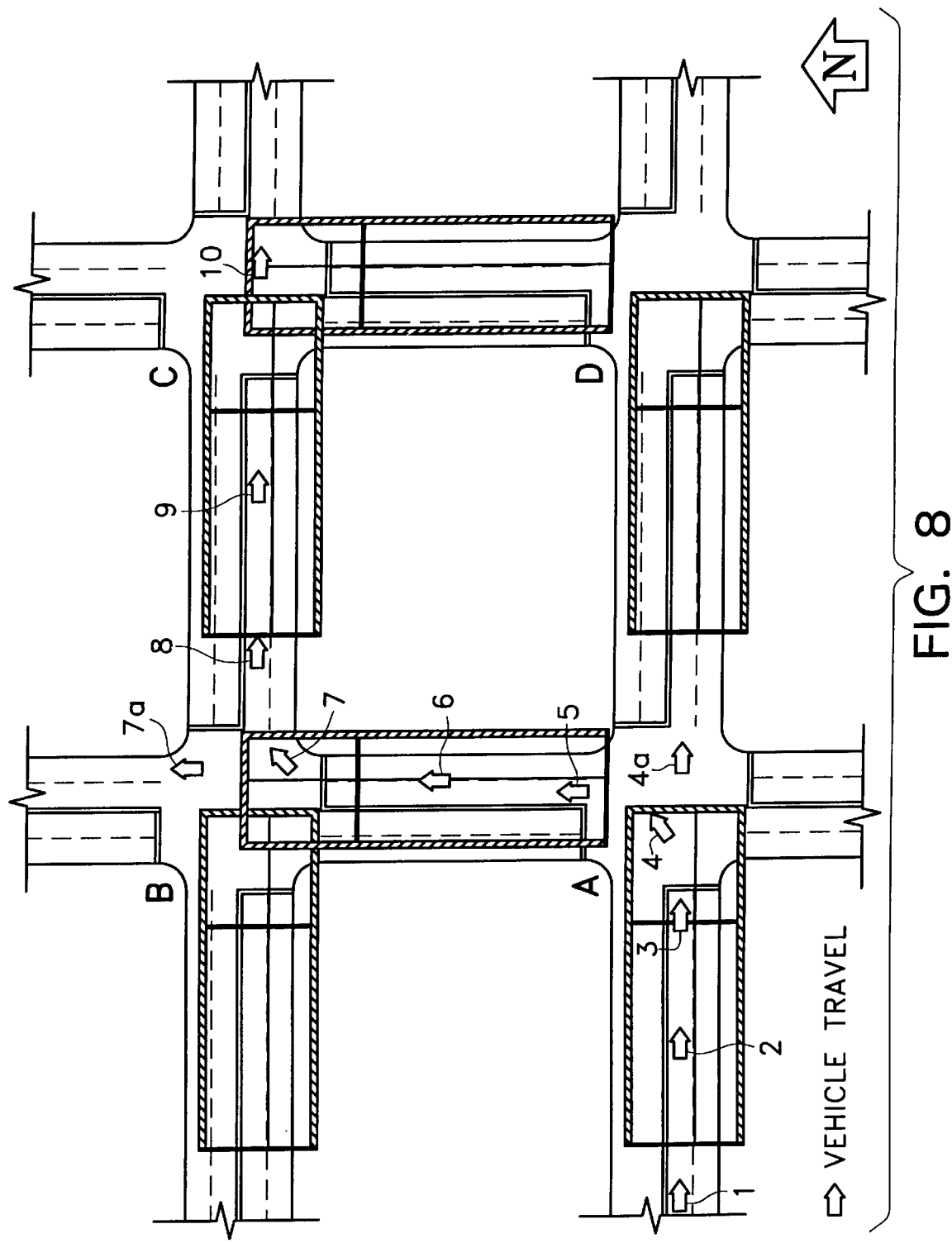
FIG. 8 is a simplified plan view of four closely spaced intersections, depicting operation of the preemption system of the invention when turn signals are utilized.

More specifically, operation of the system utilizing turn signal data is shown diagrammatically in FIG. 8, which depicts four closely spaced intersections A, B, C and D. An eastbound vehicle is approaching intersection A, as indicated at vehicle position #1. At vehicle position #2, intersection subsystem A issues an eastbound preempt output to the intersection controller. At vehicle position #3, the driver of the vehicle turns on his left-hand turn signal. The vehicle subsystem adds a left-turn bit to the transmitted data packet and this information becomes immediately available at the intersection subsystem.

At intersection B, which is located to the left of the vehicle as it approaches intersection A, the intersection subsystem (B) would normally ignore signals from the approaching vehicle because it direction of travel is eastbound and the vehicle is not within any of intersections B's preempt windows. However, because the data packet contains a left-turn but, intersection subsystem B issues an early northbound preempt request when the vehicle is at position #4, i.e. just as it is making a left turn at intersection A. This preempt request would not normally occur until the vehicle reached positions #5 or #6 and only for a vehicle travelling in a northbound direction.

In addition, if the eastbound preempt route for intersection D (located east of intersection A) were to extend beyond position #4a in the figure, and overlap the mandatory preempt window of intersection A, then intersection D might issue an eastbound preempt output unnecessarily, since the vehicle would not reach intersection D. In the system of the invention, the left-turn bit transmitted by the vehicle would also be received by the intersection subsystem at D, alerting it to the fact that the vehicle is turning and does not need preemption at intersection D.

Similarly, a right-turn bit would be added to the transmitted data if the driver turned on the right-hand turn signal when approaching intersection B. This would cause the intersection subsystem at C (east of B) to issue an early eastbound preempt output.

Another important aspect of the invention is that because each intersection subsystem receives data pertaining to the vehicle's direction of travel, as contrasted with its intended direction of travel indicated by the turn signal, each intersection can provide preemption for an appropriate direction of travel. For example, when the vehicle reaches position #10 in intersection C, it will have crossed the termination band for the eastbound preempt route but will be within the mandatory preempt window for the northbound route. However, the intersection subsystem is aware that the vehicle is travelling east and not travelling north, so the intersection will not issue a northbound preempt for the vehicle.

Conclusion

It will be appreciated from the foregoing that the present invention represents a significant advance in the field of traffic signal preemption for emergency vehicles. In particular, the invention uses accurate position, speed and direction measurements to preempt normal traffic control at an intersection without unnecessary disruption of traffic. It will also be appreciated that, although a number of related embodiments of the invention have been described in detail for purposes of illustration, other modifications may be made without departing from the spirit and scope of the invention. Accordingly, the invention should not be limited except as by the appended claims.

We claim:

1. A traffic signal preemption system using differential global positioning system (GPS) corrections, for a signalized intersection having a traffic signal controller capable of operation in a normal mode and in a preemption mode upon receiving a signal for preemption, the system comprising:
    a traffic signal subsystem, including;
        a GPS reference receiver having an antenna installed at a known position, for receiving GPS signals and computing measurement corrections for the GPS signals;
        a communication radio for receiving data from an approaching emergency vehicle, and
        an intersection computer, containing a model of the intersection and programmed such that corrected vehicle position, speed and direction measurements are used to determine when to send a signal to the traffic controller to switch to preemption mode in such a way as to minimize disruption of normal traffic;
    a vehicle subsystem, including;
        a GPS receiver for receiving GPS signals, said signals including signals from which the vehicle's position, speed and direction can be determined;
        a communication radio for transmitting data to the traffic signal subsystem radio, and
        a vehicle computer, for coordinating operation of the vehicle GPS receiver and the vehicle communication radio; and
        a differential GPS subsystem portion in communication with the GPS reference receive to receive therefrom the measurement corrections and in communication with the GPS receiver to receive the GPS signals and to compute and to provide to the interaction computer, corrected vehicle position, speed and direction.

2. A traffic signal preemption system as defined in claim 1, wherein;
    the traffic signal subsystem has a radio transmitter by which the GPS measurement corrections computed by the intersection computer are transmitted to the vehicle; and
    the vehicle computer computes the corrected measurements of the vehicle position, speed and direction for transmission to the traffic signal subsystem.

3. A traffic signal preemption system as defined in claim 1, wherein:
    the vehicle communication radio transmits uncorrected vehicle position, speed and direction measurements to the traffic signal subsystem; and
    the intersection computer computes corrected vehicle position, speed and direction measurements.

4. A traffic signal preemption system as defamed in claim 1, wherein;
    the vehicle communication radio transmits raw GPS measurements to the traffic signal subsystem; and
    the intersection computer computes corrected vehicle position, speed and direction measurements.

5. A traffic signal preemption system as defined in claim 1, wherein;
    a single GPS reference receiver serves multiple controlled traffic intersections and broadcasts GPS corrections to multiple vehicles in the same vicinity;
    the vehicle computer in each vehicle computes the corrected measurements of vehicle position, speed and direction for transmission to the traffic signal subsystem.

6. A traffic signal preemption system as defined in claim 1, wherein:
    the vehicle subsystem includes a turn signal indicator, wherein the vehicle communication radio also transmits turn signal and vehicle identification information to the traffic signal subsystem.

7. A traffic signal preemption system as defined in claim 1, and further comprising:
    means for identifying selected points for use in a learn mode on each approach route to the intersection; and
    means contained in the traffic signal subsystem, for operating in the learn mode, during which each approach route to the intersection is recorded for use in a normal mode of operation.

8. A traffic signal preemption system as defined in claim 1 wherein corrected vehicle position, speed and direction measurements are used to determine when to send a signal to the traffic controller to switch to preemption at an optimum time in such a way as to minimize description of normal traffic.

9. A traffic signal preemption system as defined in claim 8 wherein;
    the traffic signal subsystem has a radio transmitter by which the GPS measurement corrections computed by the intersection computer are transmitted to the vehicle; and
    the vehicle computer computes the corrected measuremts of the vehicle position, speed and direction for transmission to the traffic signal subsystem.

10. A method of operating a traffic signal preemption system for a signalized intersection having a traffic contoller, comprising the steps of;

receiving global positioning system (GPS) signals at a reference GPS receiver whose location is accurately known;

computing differential GPS corrections to be applied to received GPS signals;

receiving GPS signals at a vehicle GPS receiver said signals including signals from which the vehicle's position, speed and direction can be determined;

transmitting some form of the received vehicle GPS signals to a traffic signal intersection subsystem;

using the differential GPS corrections, computing corrected vehicle position, speed and direction; and computing from the corrected vehicle position, speed and direction measurements, taken with known intersection approach data, an optimum time to send a signal to the traffic controller to switch to a preemption mode of traffic control.

11. A method as defined in claim 10, wherein;

the method further includes transmitting GPS corrections to each vehicle equipped for receiving them;

the step of computing corrected vehicle position, speed and direction is performed in the vehicle; and the step of transmitting some form of received vehicle GPS signals transmits corrected vehicle position, speed and direction.

12. A method as defined in claim 10, wherein:

the step of computing corrected measurements is performed in the traffic signal intersection subsystem; and the step of transmitting some form of received vehicle GPS signals transmits uncorrected vehicle position, speed and direction measurements.

13. A method as defined in claim 10, wherein:

the step of computing corrected measurements is performed in the traffic signal intersection subsystem; and the step of transmitting some form of received vehicle GPS signals transmits raw GPS measurements obtained in the vehicle.

14. A method as defined in claim 10, and further comprising:

transmitting from the vehicle to the traffic signal intersection subsystem additional data including vehicle identification information and vehicle turn signal information.

15. A method as defined in claim 10, and further comprising:

determining in the reference GPS receiver an accurate position of the receiver, by averaging position measurements taken periodically over a long time interval.

16. A method as defined in claim 10, and further comprising operating the system in a "learn" mode of operation, including the steps of:

switching the system to learn mode;

driving the vehicle over each approach route to the intersection;

mapping the approach routes to the intersection for use in normal operation;

identifying and recording selected successive vehicle positions along each approach route to the intersection; and recording desired preemption positions for later use in normal operation.

17. A method as defined in claim 10, and further comprising the steps of;

preempting traffic control at more than one adjacent intersection, based on the vehicle's intended direction of travel through the intersection, as derived from turn signal information transmitted from the vehicle whereby only intersections through which the vehicle will pass are subject to preemption.

18. The method of claim 17 wherein the more than one intersection includes a first intersection toward which the vehicle is moving and any intersection in the system to the right or left of the first intersection as determined respectively by the right or left turn signal of the vehicle being activated.

* * * * *